March 7, 1967  J. N. VACCA ET AL  3,307,599
VEGETABLE TOPPING MACHINE

Filed March 18, 1964  3 Sheets-Sheet 2

INVENTORS
JOHN N. VACCA
DONALD A. BRATSCH
BY
ATTORNEYS

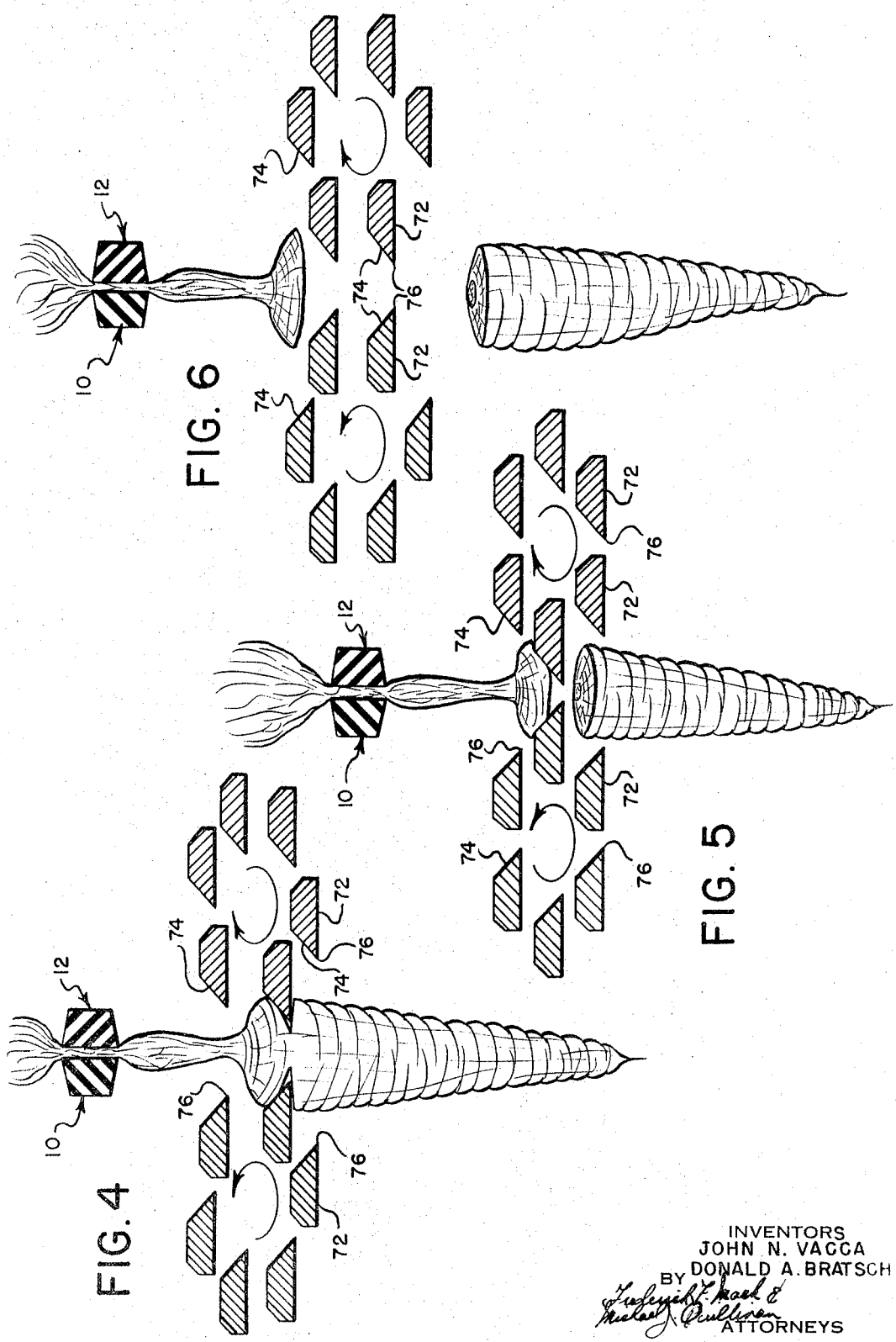

United States Patent Office 3,307,599
Patented Mar. 7, 1967

3,307,599
VEGETABLE TOPPING MACHINE
John N. Vacca and Donald A. Bratsch, Modesto, Calif., assignors to General Foods Corporation, White Plains, N.Y., a corporation of Delaware
Filed Mar. 18, 1964, Ser. No. 352,895
6 Claims. (Cl. 146—85)

This invention relates to a topping apparatus for removing the leafy or other undesired appendages of crops such as root-type vegetables like carrots and sugar beets. More particularly, the invention relates to a cutting mechanism incorporated in a field-operated machine for elevating root crops having a leafy crown, e.g., carrots, subsequent to their being lifted or plowed from the ground, which mechanism is adapted to de-top the crown and the leafy portion attached thereto from the balance of the root vegetable.

Devices have been designed and used for plowing, elevating and topping root crops, typically the machine disclosed in the U.S. Patents Nos. 1,942,011, issued January 2, 1934, and 1,964,896, issued July 3, 1934, to W. E. Urschel. Such machines are designed to elevate the uprooted crop from ground level and convey it to a topping mechanism wherein means are operative to engage the leafy portion of the crop and draw it into the topping mechanism where the crown is separated from the leafy portion by a pulling action applied to the leafy portion while the root crown is temporarily arrested, de-topping being eventually achieved by physical displacement of the root away from the engaged leafy portion.

These machines employ a pair of sets of moving bars which each travel in a circular pattern, each set moving in counter-rotation with respect to its companion set in the pair. The bars of each set engage the leafy portion of the root crop and the bars of one set are designed to move out of phase with respect to bars in the companion set as schematically portrayed in FIGS. 7, 12 and 16 of the first aforementioned Urschel patent, as well as FIG. 6 of the second aforementioned Urschel patent. By "out of phase" is meant that the bars of the respective sets arrive at or coincide with a line intersecting their respective axes of rotation at different times, alternately, such as in the case of teeth of an intermeshing pair of gears. The term "in phase" as hereafter used is intended to mean that the corresponding or mating bars of the respective sets coincide with said line at the same time. The bars serve to engage and gather in and laterally move the leafy portion of the root crop so that the root itself can be physically displaced by one bar engaging the crown portion, thereby shearing or tearing the bulky root crown from the engaged leafy portion. It will be noted that use of such bar sets serves to elevate the leafy portion of the root crop to the point at which the leafy portion is gathered within or meshed with the moving bars to achieve the topping action.

The topped crown portion may be off green colored in the case of carrots and frequently contains some leafy material which must be subsequently trimmed. This necessitates use of hand labor to remove the leafy stub and the green crown and hence increases costs considerably.

It is an object of the present invention to eliminate this consequent cost of hand labor and to provide a machine which is particularly suitable for not only removing the leafy portion but also cut off or remove an undesirable crown portion in a controllable manner which does not sacrifice desired sections of the root.

These and other objects of the invention will become more readily apparent from a consideration of the following detailed description of the invention taken in conjunction with the accompanying drawings.

Figure 3:
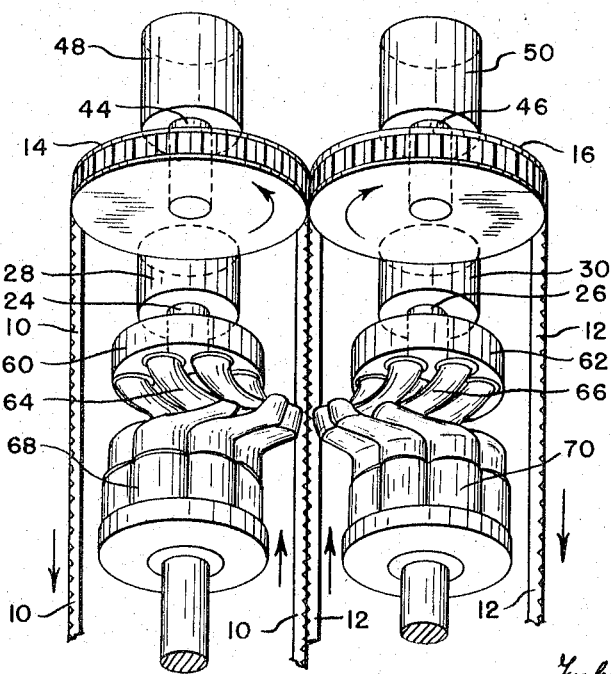
FIG. 3 is an end elevational view of the apparatus taken along line 3—3 in FIG. 1 with parts of the cutting mechanism being broken away.

And FIGS. 4, 5 and 6 are enlarged sectional views of the cutting mechanism also shown in section in FIG. 3 depicting the principle of operation for removal of leaves and crown from the root.

Figure 1:
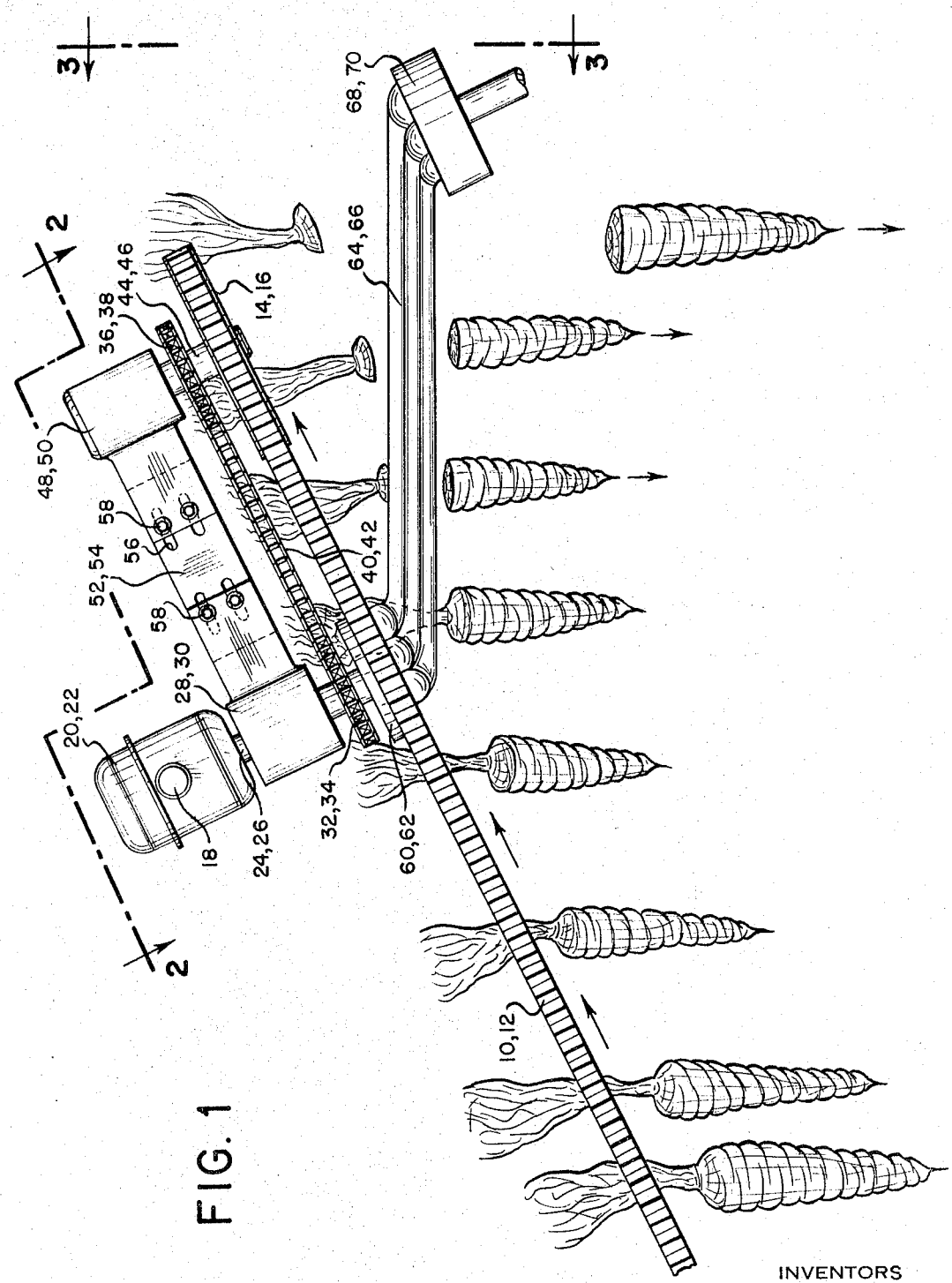
FIG. 1 is a side elevation of a mechanism embodying the invention when incorporated in a harvester of the character set forth in the aforesaid Urschel patents, which harvester-types are in common use, are well known and whose ancillary parts such as the frame, plow, puller and puller elevating mechanism form no part of this invention.
Figure 2:
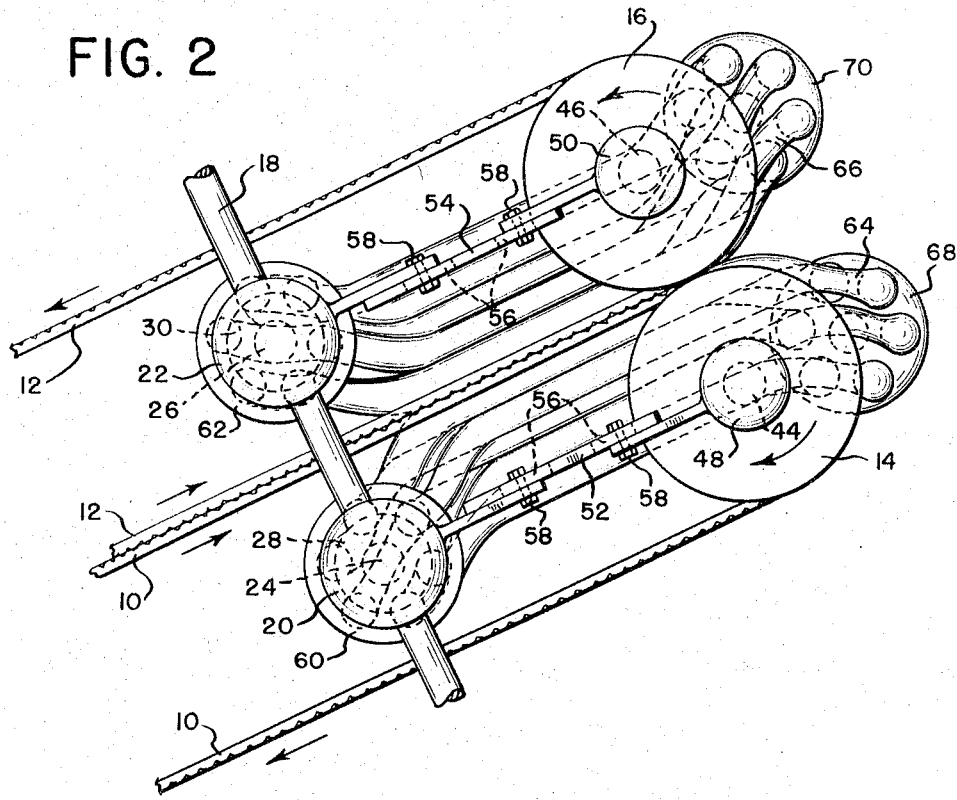
FIG. 2 is a plan view of the mechanism in FIG. 1 looking axially on the means operative to convey and cut the carrot top and showing the distinct lateral movement of the carrot crop.

Carrots removed from the soil by a carrot harvester such as has been mentioned in respect of FIG. 1 are conveyed along a straight path upwardly from horizontal ground level and rearwardly of the machine by a pair of endless conveyor belts 10, 12, driven by a pair of pulleys 14, 16, respectively, mounted on a power train driven through a common shaft on the machine. Shaft 18 connects with bevel gears (not shown) in gear boxes 20, 22 operative to drive shafts 24, 26 suitably journaled in journal housings 28, 30, respectively. Shafts 24 and 26 have fixedly mounted thereon sprocket wheels 32, 34 operative to drive sprockets 36, 38, through sprocket chains 40, 42 respectively. Sprockets 36, 38 are fixedly mounted on conveyor shafts 44, 46 which also have pulleys 14, 16 mounted thereon, shafts 44 and 46 being respectively journaled in journal housings 48, 50, adjustably connected to the housings for drive shafts 24, 26, through the intermediation of slide plate assembly 52, 54 having longitudinal slots therein as at 56, receiving adjusting bolts 58; journal housings 48 and 50 are thereby adjustable with respect to the balance of the machine in order to adjust tension on conveyor belts 10, 12.

Mounted at the extremity of each drive shaft 24 and 26 are bearing drive heads 60 and 62 of conventional design and comparable to bearing block 2 in Urschel, U.S. Patent No. 1,942,011, afore cited. Each head 60 and 62 serves as a bearing in which a set of cutting bars 64, 66 respectively, are rotatably mounted and impart, except for the phase relationship, what has come to be generically known as an Urschel movement. The other ends of the cutting bars are rotatably mounted in a rear set of heads 68 and 70, operative as idler heads and also of conventional design and supported on the aforesaid appartus described in the patents referred to in the description of FIG. 1.

As will be seen more fully by reference to FIGS. 4, 5 and 6, each cutting bar has a flat bottom face 72 and an upper angled cutting face 74 adapted to join with underface 72 in providing cutting edge portion 76. While the cutting edge portion 76 is defined by faces 72, 74 it is well within the skill of those in the art to otherwise modify topping bars so as to provide a distinct cutting edge portion adapted to engage the crown of the carrot or other root crop.

As also seen in FIGS. 4, 5 and 6, the cutting bars operate substantially in phase whereby the edge portions 76 of rotating opposed cutting bars approach one another as they move in a circular path; thus in the case of the embodiments shown in these drawings, the directly opposed and mating cutting bars in the respective sets thereof will be at a three o'clock and nine o'clock position so to speak and will continue to move circularly in this fashion. It should also be noted that the directly opposed cutting bars of the respective sets and specifically the edge portions 76 thereof are spaced at their innermost point of travel from one another by a distance comparable to the thickness of the leafy portion of the root crop so as to permit that leafy portion to be accommodated.

With the arrangement of parts herein described it will be apparent that the leafy portion of the root crop is moved laterally between belts 10, 12 and while held firmly engaged by said belts is carried upwardly into the paths of the opposite rotating cutting bars. It should be noted that the location of the innermost directly opposed cutting bars when coinciding with a line intersecting their respective axes of rotation as seen in FIGS. 4, 5 and 6 provides a nip of sufficient space so as to accommodate the leafy portion of the root crop and permit it to pass through the cutting bars while each portion of the root crop is being advanced along a substantially straight line direction in a vertical plane between the cutting bars sets 64 and 66, the locus of said straight line being at an acute angle to the longitudinal axis of said cutting bar sets and substantially perpendicular to their axes of rotation so as to avoid any tearing stress on the leafy portion when the crop is engaged by the bars. Due to the phased relationship of opposite cutting bars, they approach and later depart from the aforesaid vertical plane in timed relation so as to simultaneously engage and cut at their edge portions 76 opposite sides of the crown portion so that at the time of innermost travel of the directly opposed cutting bars a predetermined crown portion will be severed by the combined cutting and wedging action resulting from the pitch of the angled cutting face 74, the degree of the acute angle and the relative velocities of conveyer belts 10, 12 and bar sets 64 and 66 being predetermined to cause said engagement of cutting edges 76 with the crown substantially after the entire leafy portion has been elevated well above the closing nip between opposed bars. In this way the crown, still attached to the leafy portion, is cut away from the main portion of the root upon being simultaneously engaged by the spaced and directly opposed or in-phase cutting bar movement as distinguished from the out-of-phase movement of the aforesaid Urschell movement wherein the conveyer belts transfer the leafy portion of the root crop to the topping bars which engage the leafy portion and through their rotating action move the therein enmeshed leafy portion laterally and upwardly by their own action independent of the conveyer belts until the bulky crown is brought against the rotating bars, and failing to pass, is erratically torn from the leafy portion.

It will be understood that while the invention has been described with particular reference to specific apparatus, the invention is not necessarily limited thereto. Reference should therefore be had to the appended claims for a definition of the limits of the invention.

What is claimed is:

1. A root crop topping mechanism adapted to cut the crown and leafy portions from the balance of the root after it has been plowed and elevated from ground level comprising a pair of oppositely driven sets of elongate cutting bars mounted at opposite ends in bearing heads adapted to rotate said cutting bars with an Urschel-like movement, opposite cutting bars of the respective sets being rotatable in phase with one another through non-intersecting orbits, and driven conveyer means adapted to engage the leafy portion of the elevated root crop and move it in a straight line direction in a vertical plane between the cutting bar sets along a locus at an acute angle to the longitudinal axes of said bars and substantially perpendicularly to the axes of rotation of said cutting bars.

2. The invention according to claim 1 wherein the respective axes of said sets of cutting bars lie in a common plane and extend in parallel relation to each other.

3. The invention according to claim 2 wherein said respective axes of rotation are spaced apart at a distance which provides the innermost bars of the respective sets, when coinciding with the said common plane, with a clearance nip sufficient to accommodate, without cutting, the leafy portion of said root crop.

4. The invention according to claim 3 wherein said clearance nip is sufficiently small to completely sever a crown portion from said root crop.

5. The invention according to claim 4 wherein the outermost portion of each of said bars is formed with a cutting edge defined by the intersection an under surface with a cutting face angularly disposed relative thereto, said cutting face exerting a wedging action on the crown portion to completely sever same from the remainder of said root crop.

6. The invention according to claim 1 wherein said driven conveyor means comprises a pair of endless belts counter-rotating in a common plane, the inner reaches of said belts coacting to frictionally engage said leafy portion to transport said root crop along said locus extending between said cutting bar sets.

References Cited by the Examiner
UNITED STATES PATENTS
1,942,011   1/1934   Urschel.
FOREIGN PATENTS
357,711   9/1921   Germany.

WILLIAM W. DYER, Jr., *Primary Examiner.*
W. GRAYDON ABERCROMBIE, *Examiner.*